(12) United States Patent  
Ninomiya

(10) Patent No.: US 9,110,571 B2  
(45) Date of Patent: Aug. 18, 2015

(54) OPERATION INPUT SYSTEM

(71) Applicant: Satoshi Ninomiya, Nagoya (JP)

(72) Inventor: Satoshi Ninomiya, Nagoya (JP)

(73) Assignee: AISIN AW CO., LTD., Aichi-ken (JP)

( * ) Notice: Subject to any disclaimer, the term of this patent is extended or adjusted under 35 U.S.C. 154(b) by 322 days.

(21) Appl. No.: 13/721,816

(22) Filed: Dec. 20, 2012

(65) Prior Publication Data

US 2013/0246965 A1    Sep. 19, 2013

(30) Foreign Application Priority Data

Mar. 19, 2012    (JP) ................... 2012-062428

(51) Int. Cl.
*G06F 3/01* (2006.01)
*G06F 3/0484* (2013.01)
*G06F 3/0481* (2013.01)
*G06F 3/0354* (2013.01)

(52) U.S. Cl.
CPC .............. *G06F 3/0484* (2013.01); *G06F 3/016* (2013.01); *G06F 3/03547* (2013.01); *G06F 3/0481* (2013.01)

(58) Field of Classification Search
CPC .... G06F 3/016; G09B 21/002; G09B 21/003; G09B 21/004; G09B 21/005; G09B 21/007
USPC .......... 715/790, 793; 434/112, 113, 114, 115; 341/21
See application file for complete search history.

(56) References Cited

U.S. PATENT DOCUMENTS 6,587,128 B2 * 7/2003 Kanevsky et al. ............ 715/768
7,202,851 B2 * 4/2007 Cunningham et al. ........ 345/156
7,245,292 B1 * 7/2007 Custy ............................ 345/173
2003/0222858 A1 * 12/2003 Kobayashi .................... 345/173
2004/0174374 A1   9/2004 Ihara
2009/0256857 A1 * 10/2009 Davidson et al. ............. 345/619

(Continued)

FOREIGN PATENT DOCUMENTS

JP    2001-242781 A    9/2001
JP    2002-222057 A    8/2002

(Continued)

OTHER PUBLICATIONS

Extended European Search Report, dated Jun. 24, 2013, issued in corresponding European Patent Application No. 12197996.7.

(Continued)

*Primary Examiner* — Jennifer To
*Assistant Examiner* — Liang Li
(74) *Attorney, Agent, or Firm* — Sughrue Mion, PLLC

(57) ABSTRACT

An operation input system and method are provided. The system includes a display device including a display screen, an input device that provides an input into the display device and a control device that includes a protrusion control section that controls a protrusion state of each of the plurality of protrusion members in accordance with a display content in the windows displayed on the display screen. The system is controlled such that when a first window and a second window are displayed so as to partially overlap each other, the protrusion control section makes the protrusion state of the protrusion members protruded in accordance with the display content of a hidden region of the second window different from the protrusion state of the protrusion members protruded in accordance with the display content of an entire region of the first window.

5 Claims, 10 Drawing Sheets

(56) References Cited

U.S. PATENT DOCUMENTS

| | | |
|---|---|---|
| 2010/0295797 A1 | 11/2010 | Nicholson et al. |
| 2010/0299596 A1* | 11/2010 | Zalewski et al. ............ 715/702 |
| 2011/0050587 A1* | 3/2011 | Natanzon et al. ............ 345/173 |
| 2011/0215914 A1* | 9/2011 | Edwards .................... 340/407.2 |
| 2011/0287393 A1 | 11/2011 | Rebolledo-Mendez |
| 2011/0291954 A1* | 12/2011 | Djavaherian ................. 345/173 |
| 2014/0167942 A1* | 6/2014 | Kyllonen et al. .......... 340/407.2 |

FOREIGN PATENT DOCUMENTS

| | | |
|---|---|---|
| JP | 2004-145456 A | 5/2004 |
| JP | 2006-047538 A | 2/2006 |
| JP | 2010-107800 A | 5/2010 |
| JP | 2011-054196 A | 3/2011 |
| WO | 2006/042309 A1 | 4/2006 |
| WO | 2011/075390 A1 | 6/2011 |

OTHER PUBLICATIONS

Gerhard Weber Ed—Klaus Miesenberger et al: "ICCHP Keynote: Designing Haptic Interaction for a Collaborative World," Jul. 14, 2010, Computers Helping People With Special Needs, Springer Berlin Heidelberg, Berlin, Heidelberg, pp. 431-438.

* cited by examiner

F I G . 1
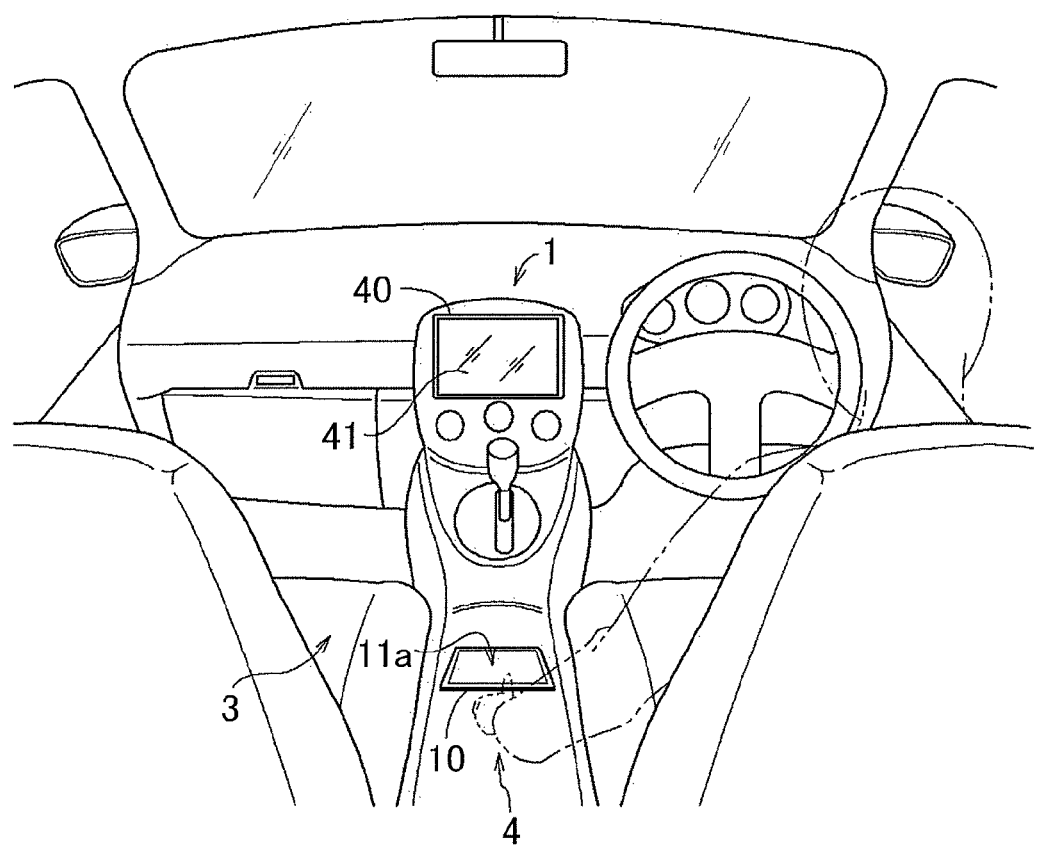

OPERATION INPUT SYSTEM

INCORPORATION BY REFERENCE

This application claims priority from Japanese Patent Application No. 2012-062428 filed on Mar. 19, 2012 including the specification, drawings and abstract, the disclosure of which is incorporated herein by reference in its entirety.

BACKGROUND OF THE INVENTION

1. Field of Invention

Aspects of the present invention relate to an operation input system including a display device including a display screen, an input device that allows an input into the display device, and a control device.

2. Description of the Related Art

An example of the operation input system described above according to the related art is described in Japanese Patent Application Publication No. 2011-54196 (JP 2011-54196 A). Specifically, JP 2011-54196 A describes a technology for providing tactile feedback through vibration or the like to an operation surface of an input device in the case where the position of an operation cursor displayed on a display screen coincides with the position of an operation figure.

It is conceivable that such an operation input system is also utilized to perform operation input to in-vehicle navigation apparatuses. In this case, because the in-vehicle navigation apparatuses are often operated by a driver of a vehicle, it is possible to enhance convenience to a user (in particular, the driver of the vehicle) if it is possible to perform operation input utilizing tactile sensation (a tactile feel) as in the technology according to JP 2011-54196 A. In the system according to JP 2011-54196 A, however, vibration from an actuator is provided as feedback via the entire input device. Thus, it is difficult to discriminate through tactile sensation as to coincidence in position between the operation cursor and the operation figure. The operation input system according to the related art leaves room for improvement in this regard.

SUMMARY OF THE INVENTION

In view of the foregoing, it is desired to provide an operation input system that enables one to perform reliable operation input compared to the related art without closely watching a display screen.

According to an aspect of the present invention, there is provided an operation input system including a display device including a display screen; an input device that provides an input into the display device; and a control device, wherein: the display device is configured to display an image including a plurality of windows on the display screen; the input device includes a plurality of protrusion members arranged along an operation surface of the input device and provided so as to independently protrude from the operation surface; the control device includes a protrusion control section that controls a protrusion state of each of the plurality of protrusion members in accordance with a display content in the windows displayed on the display screen; and in the case where at least a first window and a second window are displayed on the display screen as partially overlapping each other, the protrusion control section makes the protrusion state of the protrusion members protruded in accordance with the display content of a hidden region of the second window different from the protrusion state of the protrusion members protruded in accordance with the display content of an entire region of the first window and a displayed region of the second window, the hidden region being a region of the second window hidden under the first window in an overlapping portion between the first window and the second window, and the displayed region being a region of the second window other than the hidden region.

According to the aspect described above, the protrusion state of each of the plurality of protrusion members arranged along the operation surface of the input device is controlled in accordance with the display content in the windows displayed on the display screen. This makes it possible to form an elevated shape (stereoscopic shape) that can be easily associated with the display content on the display screen, on the operation surface on which a user performs an operation using a fingertip or the like, for example. As a result, it is possible to provide an input system that enables to perform reliable operation input compared to the related art without closely watching a display screen.

According to the aspect described above, further, in the case where a plurality of windows are displayed on the display screen as partially overlapping each other, the protrusion state of the protrusion members which are protruded in accordance with the display content of the hidden region of the second window is controlled so as to be different from the protrusion state of the protrusion members which are protruded in accordance with the display content of the entire region of the first window and the displayed region of the second window. This facilitates associating the elevated shape formed on the operation surface with the display content on the display screen compared to a case where the protrusion members are controlled to the same protrusion state. Thus, it is easy for the user to perform operation input even in the case where a plurality of windows are displayed as overlapping each other.

In the case where the first window and the second window are displayed on the display screen with no overlap between each other, the protrusion control section may control the protrusion state of each of the plurality of protrusion members in accordance with the display content of the entire region of the first window and the display content of the entire region of the second window; and in the case where the first window and the second window are displayed on the display screen as partially overlapping each other, the protrusion control section may control the protrusion state of each of the plurality of protrusion members in accordance with the display content of the entire region, including the overlapping portion, of the first window and the display content of the displayed region of the second window.

According to the configuration, the elevated shape formed on the operation surface can be caused to match the display content of a region (the entire region or a part of the region) displayed on the display screen in each window, irrespective of whether or not the first window and the second window are displayed on the display screen as overlapping each other. This makes it further easier for the user to perform operation input.

A protrusion state in which a level of a distal end portion of the protrusion member in a protrusion direction is higher than a level of the operation surface may be defined as a first state, and a protrusion state in which the level of the distal end portion of the protrusion member in the protrusion direction is not higher than a level of the operation surface may be defined as a second state; and in the case where the first window and the second window are displayed on the display screen as partially overlapping each other, the protrusion control section may control the protrusion state of each of the plurality of projection members such that the protrusion state of the protrusion members controlled in accordance with the display content of the hidden region is controlled to the second state, and such that the protrusion state of the protrusion members controlled in accordance with the display content of the entire region of the first window and the displayed region of the second window is controlled to the first state.

According to the configuration, it is possible to clearly distinguish through tactile sensation the protrusion members, the protrusion state of which is controlled in accordance with the display content of the hidden region of the second window, and the protrusion members, the protrusion state of which is controlled in accordance with the display content of the entire region of the first window and the displayed region of the second window from each other. Thus, it is easy for the user to perform operation input even in the case where a plurality of windows are displayed as overlapping each other.

The control device may include a corresponding region setting section that, in the case where a plurality of windows are displayed on the display screen, sets a corresponding region on the operation surface in correspondence with each of the plurality of windows; and in the case where both at least one slide-support region and a non-slide-support region are set on the operation surface, the slide-support region being a type of the corresponding region in which a slide operation performed on the operation surface is received as an input operation and the non-slide-support region being a type of the corresponding region other than the slide-support region, the protrusion control section may protrude the distal end portion of the protrusion member from the operation surface along a first boundary between an operation surface region including the slide-support region and an operation surface region including the non-slide-support region.

According to the configuration, an operation surface region including the slide-support region and an operation surface region including the non-slide-support region can be partitioned from each other by a stereoscopic boundary. This enables the user to clearly recognize through tactile sensation the range of a region in which a slide operation can be performed. Thus, it is easy for the user to perform operation input also in the case where both the slide-support region and the non-slide-support region are set.

In a configuration in which the protrusion control section protrudes the distal end portion of the protrusion member from the operation surface along the first boundary as described above, in the case where a first slide-support region, a second slide-support region, and the non-slide-support region are set on the operation surface, the first slide-support region being a first one of the slide-support regions and the second slide-support region being a second one of the slide-support regions, the protrusion control section may protrude the distal end portion of the protrusion member from the operation surface along a second boundary between an operation surface region including the first slide-support region and an operation surface region including the second slide-support region into a protrusion state different from the protrusion state at the first boundary.

According to the configuration, in the case where a plurality of slide-support regions are set on the operation surface, operation surface regions including the slide-support regions can be partitioned from each other by a stereoscopic boundary. This enables the user to clearly recognize through tactile sensation the range of a region in which a slide operation can be performed for each slide-support region. According to the configuration described above, further, the boundary between the operation surface regions including the slide-support regions is formed by a stereoscopic shape different from that at the boundary between an operation surface including the slide-support region and an operation surface region including the non-slide-support region. This makes it easy for the user to select through tactile sensation the slide-support region in which it is desired to perform a slide operation.

In setting both the slide-support region and the non-slide-support region on the operation surface, the corresponding region setting section may make a ratio in area of the slide-support region to the non-slide-support region higher than a ratio in area of a visible portion, on the display screen, of the window corresponding to the slide-support region to a visible portion, on the display screen, of the window corresponding to the non-slide-support region.

According to the configuration, it is easy to secure a large region for performing a slide operation, and it is possible to enhance convenience to the user who performs a slide operation.

BRIEF DESCRIPTION OF THE DRAWINGS

FIG. 1 is a schematic view showing an operation input system according to an embodiment of the present invention as mounted on a vehicle;

DETAILED DESCRIPTION OF THE EMBODIMENTS

An operation input system according to an embodiment of the present invention will be described with reference to the drawings. In the embodiment, an operation input system 3 configured to perform prescribed operational input (predetermined operation input) to a navigation apparatus 1 (in the example, an in-vehicle navigation apparatus, see FIG. 1) is described. The operation input system 3 includes a display input device 40 and an operation input device 4 communicably connected to the navigation apparatus 1. In the following, a schematic configuration of the navigation apparatus 1, the configuration of the operation input device 4, the configuration of the operation input system 3, and the process procedures of an operation input reception process are described below. In the embodiment, the operation input device 4 corresponds to the "input device" according to the present invention, and the display input device 40 corresponds to the "display device" according to the present invention.

1. Schematic Configuration of Navigation Apparatus

Figure 2:
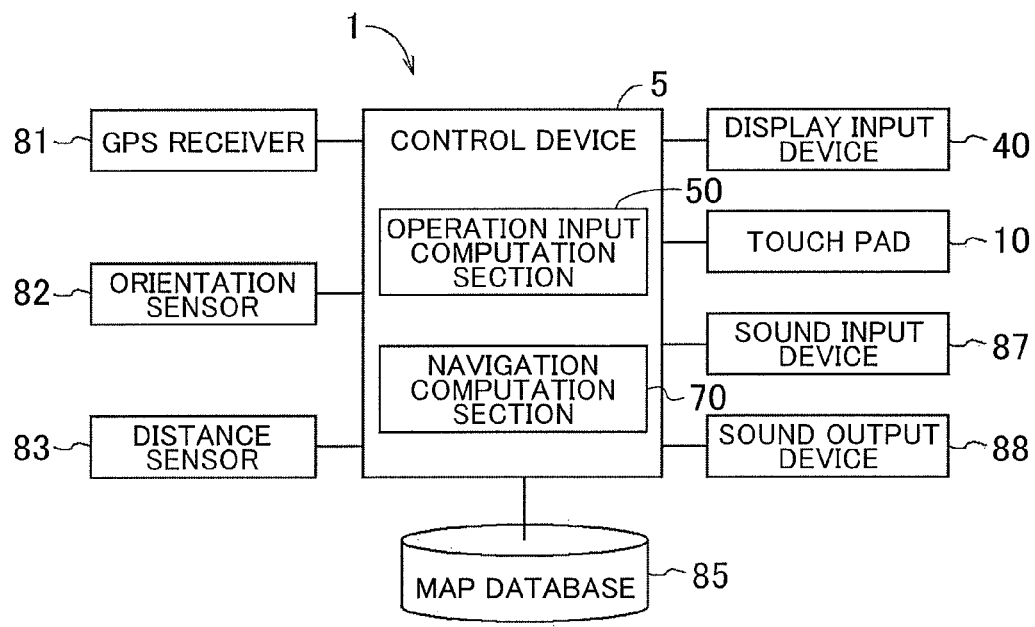
FIG. 2 is a block diagram showing a schematic configuration of a navigation apparatus according to the embodiment of the present invention.

A schematic configuration of the navigation apparatus 1 will be described with reference to FIGS. 1 and 2. The navigation apparatus 1 includes a control device 5 as shown in FIG. 2, and is configured to achieve basic functions such as displaying the vehicle position, searching for a route from a departure place to a destination, providing route guidance, and searching for a destination. The control device 5 includes an arithmetic processing unit such as a central processing unit (CPU) serving as a core member, and is formed as a processing device configured to perform a variety of processes on input data. The control device 5 includes an operation input computation section 50 and a navigation computation section 70. The control device 5 is communicably connected to each of a Global Positioning System (GPS) receiver 81, an orientation sensor 82, a distance sensor 83, a map database 85, the display input device 40, the touch pad 10, a sound input device 87, and a sound output device 88.

The GPS receiver 81 receives GPS signals from Global Positioning System (GPS) satellites. The orientation sensor 82 detects the orientation of travel of the vehicle (vehicle on which the navigation apparatus 1 is mounted) or variations in the orientation of travel of the vehicle. The distance sensor 83 detects the vehicle speed or the travel distance of the vehicle. The navigation computation section 70 derives an estimated vehicle position on the basis of information obtained from the GPS receiver 81, the orientation sensor 82, and the distance sensor 83. In this event, the navigation computation section 70 performs correction (a map matching process) for matching the estimated vehicle position with a road shown on a road map as necessary.

The map database 85 stores map data to be referenced when the navigation computation section 70 executes various processes or the like. The map data include road network data describing a plurality of nodes corresponding to a plurality of intersections and a plurality of links corresponding to roads connecting adjacent nodes. The map database 85 is a database constructed by a storage device. The storage device includes as a hardware component a storage medium that can store information so as to be rewritable such as a hard disk drive or a flash memory, for example.

The display input device 40 is a device formed by integrating a display device such as a liquid crystal display device and an input device such as a touch panel. The display input device 40 includes a display screen 41, and is configured to be able to display an image (see FIG. 6) including a plurality of windows 60 on the display screen 41. An image of a map of an area around the vehicle position, an image of an operation figure 44 associated with a particular function, or the like, for example, is displayed inside each window 60. The operation figure 44 is a figure displayed on the display screen 41 to allow a user (a passenger of the vehicle) to perceive the function associated with the operation figure 44, and is represented by an icon, a button image, a character key image, or the like, for example. The display input device 40 senses an object to be sensed (such as a fingertip or the tip of a stylus pen, for example) in contact with or in proximity to the touch panel to receive input corresponding to the sensed position of the object. The phrase "in proximity to" refers to a state in which the distance between the object to be sensed and the touch panel is less than a sensible distance determined in accordance with the sensitivity of the touch panel.

In the case where the sensed position of the object falls on the position of the operation figure 44, it is determined that a select operation for the operation figure 44 has been performed so that the navigation computation section 70 executes a process related to the function associated with the operation figure 44. In the case where the sensed position of the object falls on a position (location) on a map, meanwhile, the navigation computation section 70 executes a process for scrolling the map in the direction toward the location, or it is determined that a select operation for the location has been performed so that the navigation computation section 70 executes a process for setting the location as a destination place, for example.

As shown in FIG. 1, the touch pad 10 is provided separately from the display input device 40, and functions as a pointing device. The touch pad 10 includes an operation surface 11*a* provided at a distance from the display input device 40, and receives an operation performed on the operation surface 11*a* as an input operation. The touch pad 10 will be described in detail later in "2. Configuration of Operation Input Device".

The display input device 40 is disposed at a position at which the display input device 40 can be seen without the need for the user (in particular, the driver of the vehicle) to significantly change his/her viewing direction during drive so as to be easily seeable by the user. On the other hand, the touch pad 10 is disposed at a position easily accessible to the hand of the user and farther from the viewing direction of the user than the display input device 40 so as to be easily operable by the user. In the example shown in FIG. 1, the display input device 40 is disposed at the center portion of the upper surface of the dashboard, and the touch pad 10 is disposed at the center console portion.

The sound input device 87 is configured to include a microphone, for example, and receives voice input from the user. The navigation computation section 70 executes processes such as searching for a destination through voice recognition or making a handsfree call, for example, on the basis of voice commands received through the sound input device 87. The sound output device 88 is configured to include a speaker, for example, and outputs audio sound and guiding voice for voice guidance.

2. Configuration of Operation Input Device

The configuration of the operation input device 4 will be described with reference to the FIGS. 3 to 5. The operation input device 4 is a device configured to perform input to the display input device 40. In the example, the operation input device 4 includes the touch pad 10, protrusion members 20, and drive mechanisms 30. The touch pad 10 includes an operation plate 11, and the operation surface 11*a* is formed on the surface of the operation plate 11. The touch pad 10 may be of a variety of types such as a resistance film type, a capacitance type, and a pressure sensitive type. In the example, the touch pad 10 is of the capacitance type. A substrate and an electrode layer (none of which is shown) are provided on the back surface side of the operation surface 11*a* of the operation plate 11. The touch pad 10 senses the object to be sensed in contact with or in proximity to the operation surface 11*a* to receive input corresponding to the sensed position of the object. The phrase "in proximity to" refers to a state in which the distance between the object to be sensed and the operation surface 11*a* is less than a sensible distance determined in accordance with the sensitivity of the touch pad 10.

The operation plate 11 is provided with a plurality of hole portions 12 that penetrate through the operation plate 11. The hole portions 12 are provided so as not to interfere with wiring members (not shown) provided on the back surface side of the operation surface 11a of the operation plate 11. The operation input device 4 includes a plurality of protrusion members 20. One protrusion member 20 is inserted into each of the hole portions 12. That is, the operation input device 4 includes a plurality of protrusion members 20, the number of which is the same as that of the hole portions 12. Each of the hole portions 12 is formed to have a circular shape as seen from the surface side of the operation plate 11. The hole portions 12 are arranged along the operation surface 11a. In the example, the hole portions 12 are arranged in a matrix (orthogonal grid), and arranged regularly at constant intervals in each of the vertical and horizontal directions over the entire operation surface 11a. Hence, the protrusion members 20 are also arranged along the operation surface 11a. In the example, the protrusion members 20 are arranged regularly (specifically, in a matrix) on the operation surface 11a.

Figure 5:
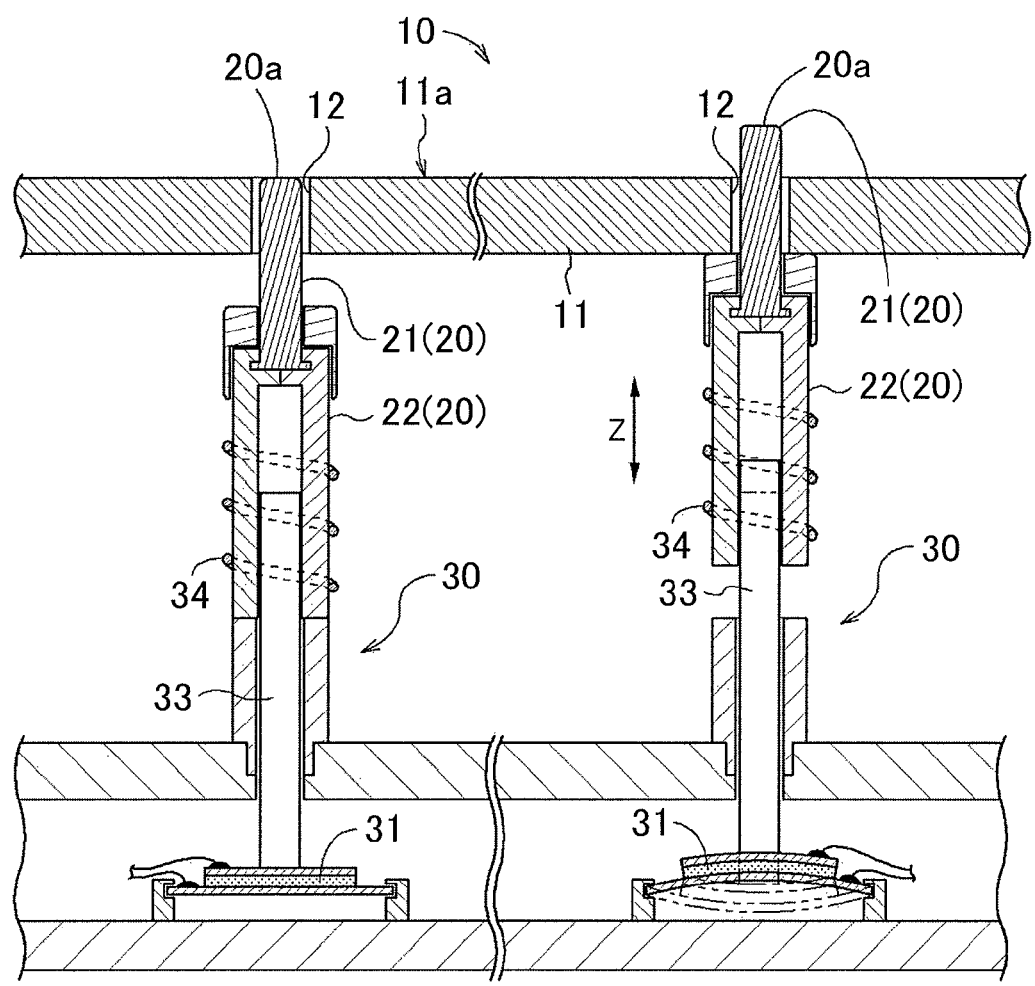
FIG. 5 is a sectional view showing the configuration of a drive mechanism according to the embodiment of the present invention.

As shown in FIG. 5, the protrusion member 20 includes a pin member 21 formed in the shape of an elongated circular column (pin) and a tubular member 22 that is generally cylindrical. The lower end portion of the pin member 21 is retained by the tubular member 22. In the example, the pin member 21 is inserted into each of the hole portions 12 from the lower side. The plurality of protrusion members 20 are provided so as to be able to protrude and retract from the operation surface 11a (in other words, so as to be freely advanced and retracted) independently under control by the protrusion control section 52 to be discussed later. In the example, as shown in FIG. 5, the protrusion direction Z of the protrusion members 20 is defined as a direction that is orthogonal to the operation surface 11a. Herein, the level is defined along the protrusion direction Z, with the term "upper" representing the direction from the back surface side toward the surface side of the operation surface 11a along the protrusion direction Z (upward in FIG. 5), and with the term "lower" representing the direction from the surface side toward the back surface side of the operation surface 11a along the protrusion direction Z (downward in FIG. 5).

Each of the protrusion members 20 is driven by the drive mechanism 30 provided on the back surface side with respect to (below) the operation plate 11. In the embodiment, the drive mechanism 30 is formed to include a piezoelectric element 31 that vibrates in the protrusion direction Z. A coupling member 33 is coupled to the piezoelectric element 31. The distal end portion (upper end portion) of the coupling member 33 opposite to the side on which the coupling member 33 is coupled to the piezoelectric element 31 is inserted into a space inside the tubular member 22. A spring member 34 is provided so as to surround the tubular member 22 from the outer peripheral side. When the piezoelectric element 31 is not vibrated, the level (position in the protrusion direction Z) of the protrusion member 20 is maintained through static friction between the coupling member 33 and the tubular member 22.

A preload applied to the inner peripheral side by the spring member 34 is set to such a magnitude that enables the tubular member 22 to slide with respect to the coupling member 33 by vibrating the piezoelectric element 31. Specifically, the tubular member 22 can be moved upward with respect to the coupling member 33 by setting the speed of vibration of the piezoelectric element 31 caused by the drive mechanism 30 toward the upper side to be lower than the speed of vibration toward the lower side. As a result, it is possible to establish a first state in which the level of a distal end portion 20a of the protrusion member 20 in the protrusion direction Z is higher than the operation surface 11a as shown in the right side of FIG. 5. In the first state shown in the right side of FIG. 5, the protrusion member 20 is positioned at the highest within its movable range in the protrusion direction Z (in the maximally displaced state), that is, the protrusion amount of the protrusion member 20 from the operation surface 11a coincides with the maximum protrusion amount. The first state includes an "intermediately displaced state" in which the protrusion amount of the protrusion member 20 from the operation surface 11a is larger than "0" and smaller than the maximum protrusion amount. In the embodiment, the maximum protrusion amount is set to be equal to or less than 20% of the thickness of a fingertip serving as the object to be sensed. This enables the difference in level due to the protrusion member 20 to be absorbed by the flexibility of the ball of a finger when the finger is slid along the operation surface 11a even in the case where the protrusion member 20 is in the maximally displaced state.

On the other hand, the tubular member 22 can be moved downward with respect to the coupling member 33 by setting the speed of vibration of the piezoelectric element 31 caused by the drive mechanism 30 toward the upper side to be higher than the speed of vibration toward the lower side. As a result, it is possible to establish a second state in which the level of the distal end portion 20a of the protrusion member 20 in the protrusion direction Z is equal to or lower than the operation surface 11a (that is, in a retracted state) as shown in the left side of FIG. 5. In the second state shown in the left side of FIG. 5, the level of the distal end portion 20a of the protrusion member 20 in the protrusion direction Z coincides with the level of the operation surface 11a. In the example, the level of the distal end portion 20a of the protrusion member 20 in the protrusion direction Z coincides with the level of the operation surface 11a when the protrusion member 20 is positioned at the lowest within its movable range in the protrusion direction Z (in the minimally displaced state). It is possible to transition the protrusion state of the protrusion member 20 which has been in the first state into the second state by depressing the protrusion member 20 downward, irrespective of vibration of the piezoelectric element 31. The difference between the speed of vibration of the piezoelectric element 31 toward the upper side and the speed of vibration toward the lower side can be adjusted by changing the duty ratio of a pulsed voltage applied to the piezoelectric element 31 in accordance with the direction of vibration of the piezoelectric element 31.

3. Configuration of Operation Input System

Figure 3:
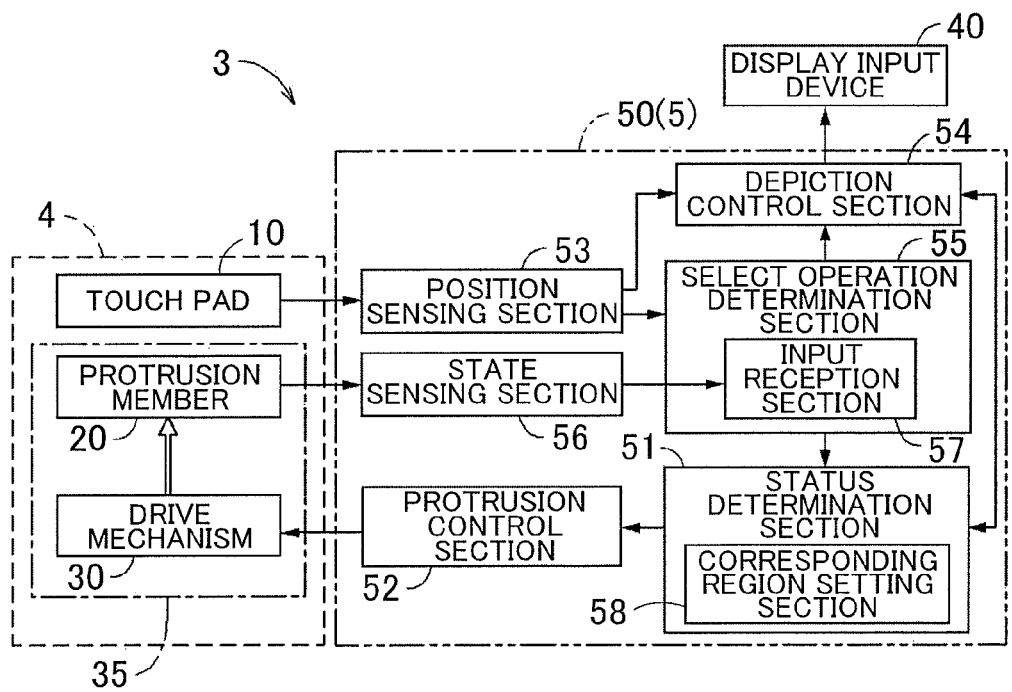
FIG. 3 is a block diagram showing a schematic configuration of the operation input system according to the embodiment of the present invention.
Figure 4:
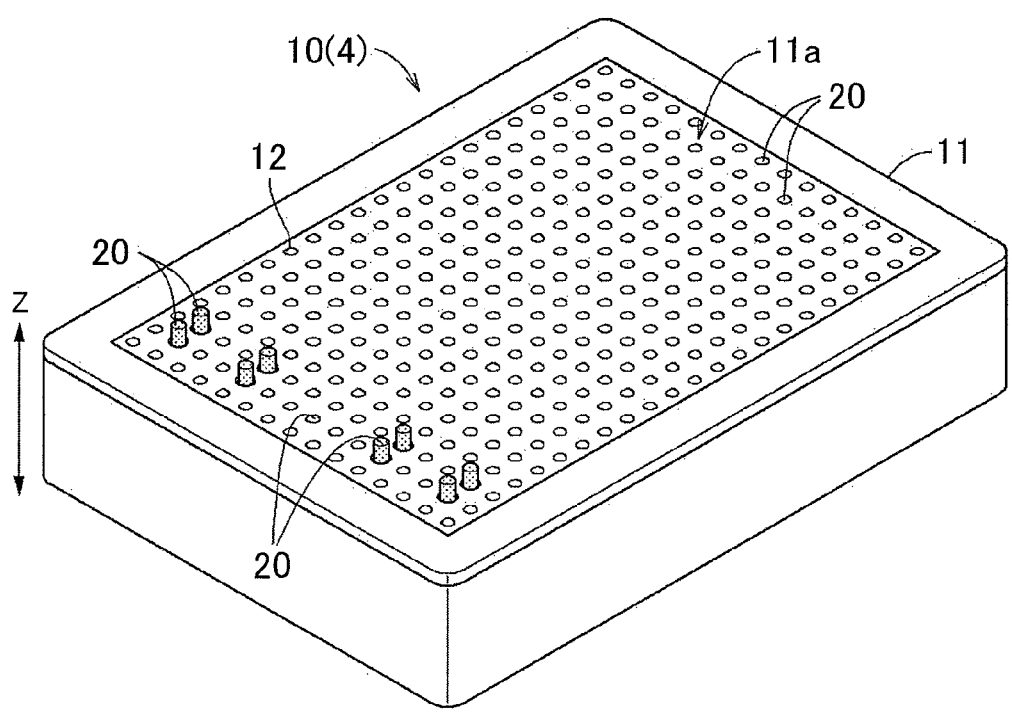
FIG. 4 is a perspective view of a touch pad provided in the operation input system according to the embodiment of the present invention.

As shown in FIG. 3, the operation input system 3 includes the operation input device 4 discussed above, the display input device 40, and the control device 5 (specifically, the operation input computation section 50) interposed between the operation input device 4 and the display input device 40. The operation input device 4 and the display input device 40 are communicably connected to each other via the control device 5. In the embodiment, the control device 5 includes hardware common to a control device for the navigation apparatus 1. In addition, the operation input computation section 50 is provided as a functional section separate from the navigation computation section 70 (see FIG. 2). The operation input computation section 50 may also be provided as a functional section common to the navigation computation section 70.

The operation input computation section 50 includes a status determination section 51, the protrusion control section 52, a position sensing section 53, a depiction control section 54, and a select operation determination section 55. In the embodiment, the operation input computation section 50 further includes a state sensing section 56 and an input reception section 57.

Figure 6:
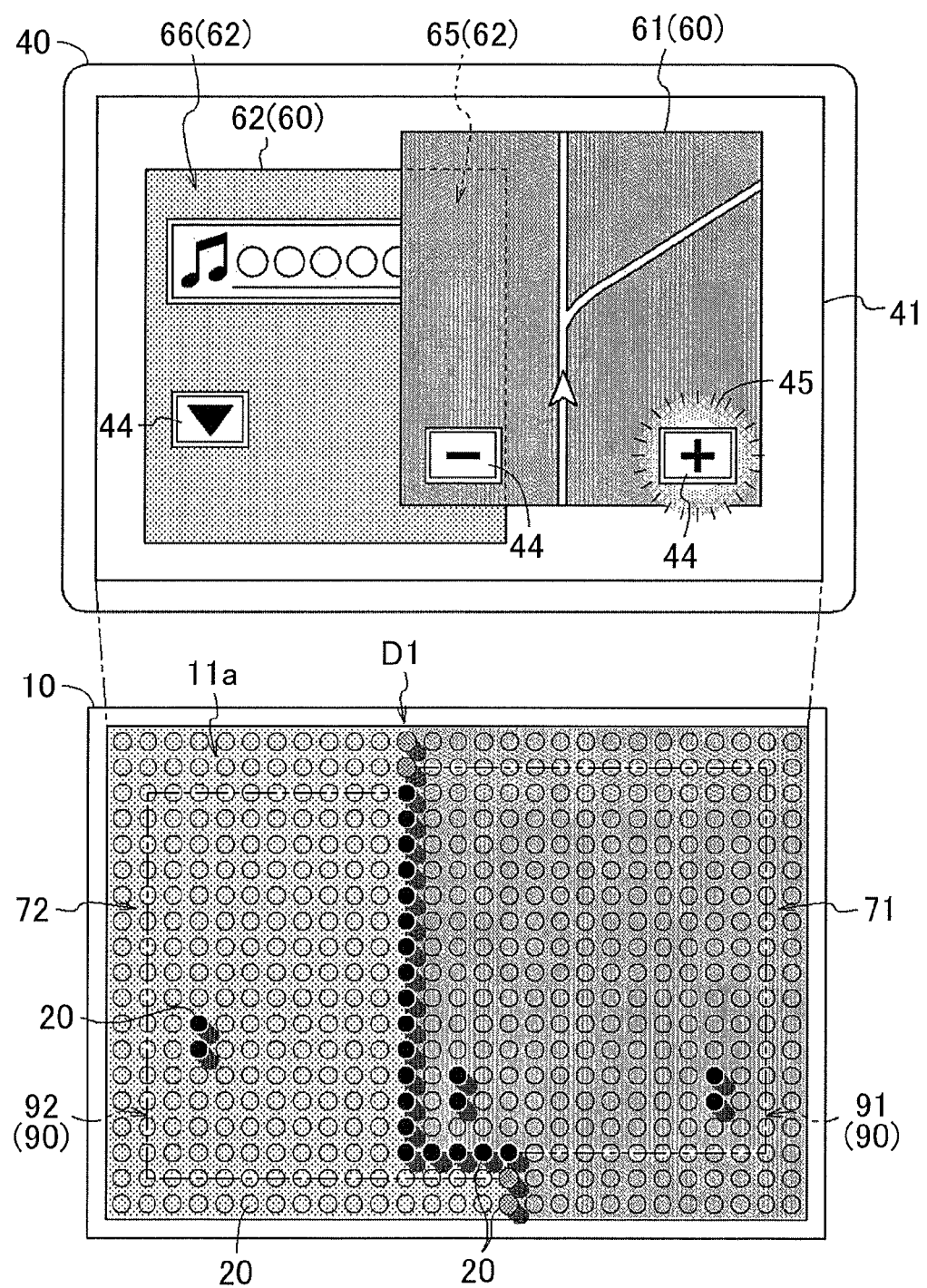
FIG. 6 shows a first example of the relationship between a display screen and operation surface regions of the touch pad according to the embodiment of the present invention.

The depiction control section 54 is a functional section that controls depiction of an image to be displayed on the display screen 41. The depiction control section 54 is configured to be able to control depiction of an image including a single or a plurality of windows 60 as shown in FIG. 6. Herein, the windows 60 do not include a root window that functions as wallpaper (background). The depiction control section 54 sets the position of each window 60 on the display screen 41 on the basis of an operation performed by the user, a predefined rule, or the like. In the case where a plurality of windows 60 are displayed on the display screen 41 as partially overlapping each other, the depiction control section 54 sets the upper-lower relationship between the plurality of windows 60 on the basis of an operation performed by the user, a predefined rule, or the like. In a portion in which the windows 60 overlap each other, the front-side window 60 is basically displayed, and the back-side window 60 is not displayed.

Figure 7:
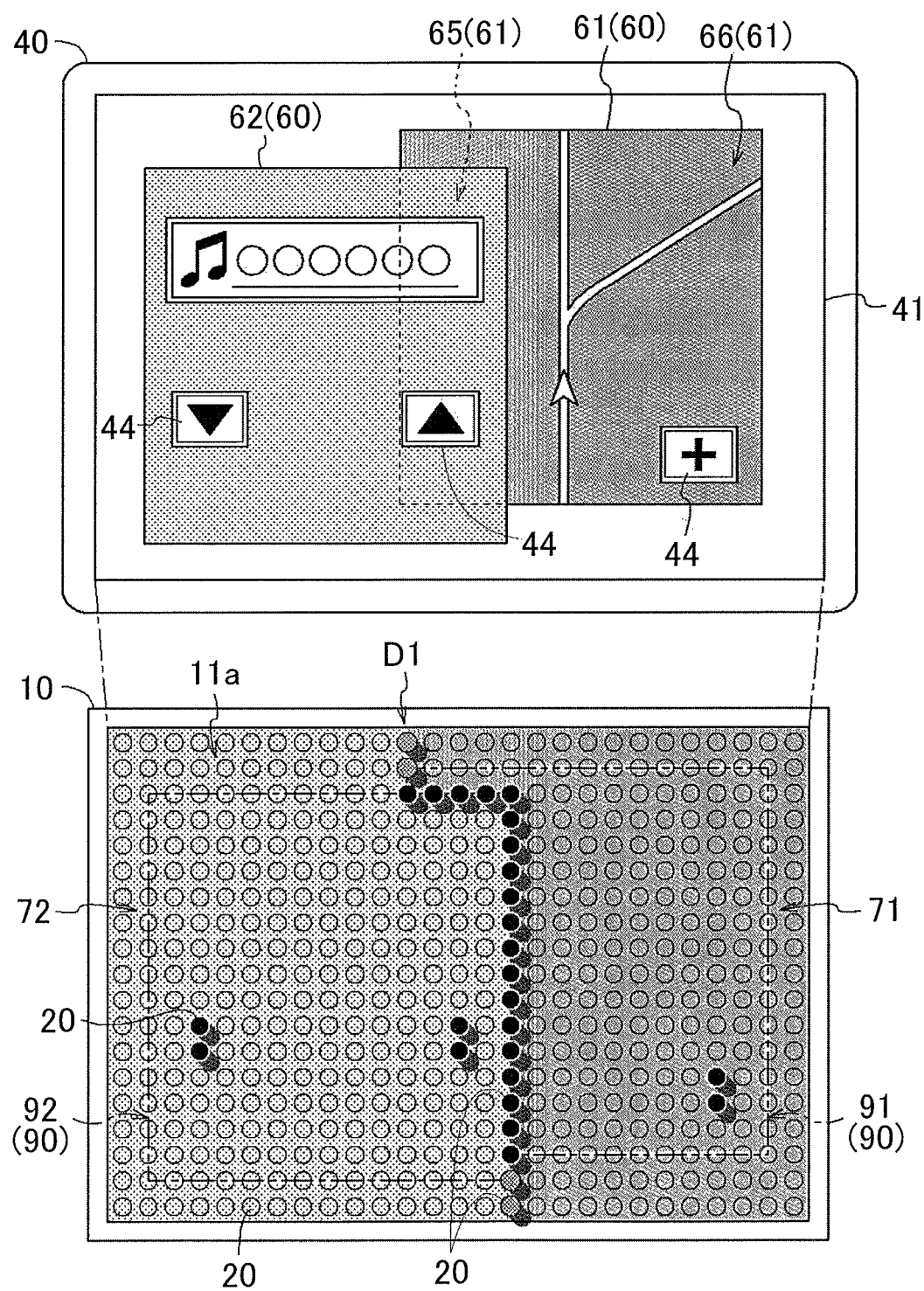
FIG. 7 shows a second example of the relationship between the display screen and the operation surface regions of the touch pad according to the embodiment of the present invention.

As shown in FIGS. 6 and 7, an image of a map around the vehicle position, for example, is displayed in the window 60. In the examples shown in FIGS. 6 and 7, a map image is displayed inside a slide-support window 61 to be discussed later, and two operation figures 44 corresponding to a function for changing the scale of the map image are displayed as superimposed on the map image. In addition, an audio setting screen, for example, is displayed in the window 60. In the examples shown in FIGS. 6 and 7, an audio setting screen containing images of two operation figures 44 corresponding to a function for volume adjustment is displayed inside a non-slide-support window 62 to be discussed later.

In the examples shown in FIGS. 6 and 7, two windows 60 are displayed on the display screen 41 as partially overlapping each other. Specifically, the slide-support window 61 and the non-slide-support window 62 are displayed as partially overlapping each other. The term "slide-support window" refers to a window 60 that receives as an operation input to the display input device 40 a slide operation in which the object to be sensed is slid with the object to be sensed in contact with or in proximity to the display screen 41. The slide operation includes a pinch-in operation, a pinch-out operation, a flick operation, and a trace operation. The trace operation is an operation of tracing a road in a displayed map image.

In the case where the slide-support window 61 is a window 60 over the non-slide-support window 62 as shown in FIG. 6, a partial region of the non-slide-support window 62 serves as a hidden region 65 which is hidden under the slide-support window 61 in the portion in which the slide-support window 61 and the non-slide-support window 62 overlap each other. In this case, the image displayed on the display screen 41 includes the display content of the entire region of the slide-support window 61 and the display content of a displayed region 66 of the non-slide-support window 62, which is a region of the non-slide-support window 62 other than the hidden region 65. That is, in the state shown in FIG. 6, the slide-support window 61 corresponds to the "first window" according to the present invention, and the non-slide-support window 62 corresponds to the "second window" according to the present invention. In FIGS. 6 and 7 and FIGS. 8 and 11 to be referenced later, in order to facilitate understanding of the present invention, the outer periphery of the hidden region 65 which is actually not shown on the display screen 41 is indicated by the broken line.

In the case where the non-slide-support window 62 is a window 60 over the slide-support window 61 as shown in FIG. 7, on the other hand, a partial region of the slide-support window 61 serves as a hidden region 65 which is a region hidden under the non-slide-support window 62 in the portion in which the slide-support window 61 and the non-slide-support window 62 overlap each other. In this case, the image displayed on the display screen 41 includes the display content of the entire region of the non-slide-support window 62 and the display content of a displayed region 66 of the slide-support window 61, which is a region of the slide-support window 61 other than the hidden region 65. That is, in the state shown in FIG. 7, the non-slide-support window 62 corresponds to the "first window" according to the present invention, and the slide-support window 61 corresponds to the "second window" according to the present invention.

The protrusion control section 52 is a functional section that controls the protrusion state of each of the plurality of protrusion members 20 in accordance with the display content in the windows 60 displayed on the display screen 41. The display content in the windows 60 includes operation figures 44, partition lines, etc. The term "partition line" refers to a display element that divides the window 60 into a plurality of (for example, two) regions configured to display independent images. The protrusion state to be established by each protrusion member 20 is determined by the status determination section 51 to be discussed later. The protrusion control section 52 controls the drive mechanism 30 on the basis of the results of the determination performed by the status determination section 51 to control the protrusion state of each protrusion member 20. In the embodiment, as discussed above, the drive mechanism 30 is a mechanism including the piezoelectric element 31, and the protrusion state of the protrusion member 20 is basically maintained in the same state unless the piezoelectric element 31 is vibrated. Therefore, in the embodiment, the protrusion control section 52 basically controls only the drive mechanism 30 corresponding to the protrusion member 20, the protrusion state of which needs to be changed.

The position sensing section 53 acquires a sensed position of the object to be sensed (in the example, a fingertip) on the operation surface 11a of the touch pad 10. In the embodiment, the position sensing section 53 specifies the position of an electrode most approached by the object to be sensed on the basis of variations in capacitance of the electrodes caused when the object to be sensed is brought into contact with or into proximity to the operation surface 11a. Then, the position sensing section 53 acquires the specified position of the electrode as the sensed position on the operation surface 11a to receive input corresponding to the sensed position. In the case where an operation of sliding the object to be sensed is performed on the operation surface 11a of the touch pad 10, in addition, the position sensing section 53 receives the slide operation as an operation input to the touch pad 10. The position sensing section 53 outputs information on the acquired sensed position to the depiction control section 54 and the select operation determination section 55. In the embodiment, as shown in FIG. 6, an operation cursor 45 is displayed on the display screen 41 in correspondence with the position of the object to be sensed on the operation surface 11a.

The state sensing section 56 senses the first state and the second state of the protrusion members 20. The state sensing section 56 is configured to be able to acquire information from a position sensor (not shown) that detects the position of the protrusion member 20 in the protrusion direction Z, for example, and senses the actual protrusion state (actual protrusion status) of each protrusion member 20 on the basis of the acquired position of each protrusion member 20 in the protrusion direction Z. The state sensing section 56 outputs the acquired information on the protrusion state of the protrusion member 20 to the input reception section 57 of the select operation determination section 55.

The select operation determination section 55 determines whether or not a select operation is performed for an operation figure 44 displayed on the display screen 41. The select operation determination section 55 determines whether or not a select operation is performed for an operation figure 44 on the basis of an operation of the object to be sensed performed on the operation surface 11a. Specifically, as discussed later, the coordinates of the display screen 41 and the coordinates of the operation surface 11a are correlated with each other. In the case where a subject operation is sensed in a region around the coordinates on the operation surface 11a corresponding to the coordinates on the display screen 41 of an operation figure 44, the select operation determination section 55 determines that a select operation for the operation figure 44 has been performed so that the control device 5 (for example, the navigation computation section 70) executes a process related to the function associated with the operation figure 44. Examples of the "subject operation" include an operation of bringing the object to be sensed, which has not been in contact with the operation surface 11a, into contact with the operation surface 11a (touch operation), an operation of temporarily moving the object to be sensed, which has been in contact with the operation surface 11a, away from the operation surface 11a and thereafter bringing the object to be sensed into contact with the operation surface 11a again (tap operation), and an operation of performing two tap operations within a predetermined time (double-tap operation).

In the embodiment, as discussed later, the protrusion status of one or more protrusion members 20 positioned at the coordinates on the operation surface 11a corresponding to the coordinates on the display screen 41 of an operation figure 44 is controlled to the first state. Then, in the case where a depression operation for a protrusion member 20 has been sensed on the basis of the information acquired from the state sensing section 56 via the input reception section 57, the select operation determination section 55 determines that a select operation for an operation figure 44 corresponding to the protrusion member 20 has been performed. In the example, in the case where the protrusion state of a protrusion member 20 is transitioned from the first state to the second state, it is determined that a depression operation for the protrusion member 20 has been performed.

The status determination section 51 is a functional section that correlates the coordinates of the display screen 41 and the coordinates of the operation surface 11a with each other, and that determines a protrusion status representing the protrusion state of each of the protrusion members 20 in accordance with the content (display content) of an image displayed on the display screen 41. In the following description, the up-down direction refers to the vertical direction (up-down direction in FIG. 6) and the left-right direction refers to the horizontal direction (left-right direction in FIG. 6) for each of the display screen 41 and the operation surface 11a. That is, the up-down direction and the left-right direction for the display screen 41 are orthogonal to each other in a plane parallel to the display screen 41. Meanwhile, the up-down direction and the left-right direction for the operation surface 11a are orthogonal to each other in a plane parallel to the operation surface 11a. The up-down direction of the operation surface 11a is correlated with the up-down direction of the display screen 41. The left-right direction of the operation surface 11a is correlated with the left-right direction of the display screen 41. In the embodiment, as also shown in FIG. 1, both the display screen 41 and the operation surface 11a are formed in such a rectangular shape that the dimension in the horizontal direction (left-right direction) is larger than the dimension in the vertical direction (up-down direction). In the embodiment, further, the display screen 41 and the operation surface 11a have the same aspect ratio.

The protrusion status determined by the status determination section 51 includes the "first state" and the "second state" discussed above. The "first state" includes the "maximally displaced state" and the "intermediately displaced state" discussed above. Meanwhile, in the example, the "second state" corresponds to the "minimally displaced state" as described above. The status determination section 51 determines which of the first state and the second state the protrusion state of each protrusion member 20 is brought into. In the case where the first state is selected, the status determination section 51 further determines which of the maximally displaced state and the intermediately displaced state the protrusion state of each protrusion member 20 is brought into. In the embodiment, the first state basically corresponds to the maximally displaced state.

When the image displayed on the display screen 41 is changed (for example, the front-back relationship between the plurality of windows 60 is changed) in accordance with an operation performed by the user, a predefined rule, or the like, the status determination section 51 determines a difference between the protrusion status corresponding to the image before the change and the protrusion status corresponding to the image after the change for each of the protrusion members 20. Specifically, the status determination section 51 determines which one of "not changed", "transitioned to the first state", and "transitioned to the second state" is applied to each of the protrusion members 20. The status determination section 51 outputs information on the protrusion status, or the difference in protrusion status, determined for each of the protrusion members 20 to the protrusion control section 52.

In the embodiment, in the case where an operation figure 44 is displayed on the display screen 41, the status determination section 51 determines that the protrusion status of one or more (in the example, two) protrusion members 20 positioned at the coordinates (hereinafter referred to as "corresponding coordinates") on the operation surface 11a corresponding to the coordinates on the display screen 41 of the operation figure 44 is the first state. On the other hand, the status determination section 51 determines that the protrusion status of the protrusion members 20 positioned at the coordinates on the operation surface 11a corresponding to the coordinates on the display screen 41 of a region in which the operation figure 44 is not displayed is the second state.

In this event, an operation figure 44 hidden under another window 60 is not displayed on the display screen 41, and therefore is treated as if it were not present. That is, an operation figure 44 disposed in the window 60 is considered in determining a protrusion status only in the case where the operation figure 44 is included in the image displayed on the display screen 41. In the case where an operation figure 44 is included in the image displayed on the display screen 41, it is determined that the protrusion status of the protrusion members 20 positioned at the coordinates on the operation surface 11a corresponding to the coordinates of the operation figure 44 is the first state. In the case where the operation figure 44 is not included in the image displayed on the display screen 41, on the other hand, it is determined that the protrusion status of the protrusion members 20 positioned at the coordinates on the operation surface 11a corresponding to the coordinates of the operation figure 44 is the second state unless the window 60 positioned on the front side has an operation figure 44 at the same position.

The protrusion control section 52 discussed above controls the protrusion state of each protrusion member 20 on the basis of the results of the determination performed by the status determination section 51. As a result, in the case where at least the first window (the slide-support window 61 in FIG. 6, and the non-slide-support window 62 in FIG. 7) and the second window (the non-slide-support window 62 in FIG. 6, and the slide-support window 61 in FIG. 7) are displayed on the display screen 41 as partially overlapping each other as shown in FIGS. 6 and 7, the protrusion state of the protrusion members 20 which are protruded in accordance with the display content of the hidden region 65 of the second window, which is hidden under the first window in the overlapping portion, is made different from the protrusion state of the protrusion members 20 which are protruded in accordance with the display content of the entire region of the first window and the displayed region 66 of the second window.

Specifically, in the case where the first window and the second window are displayed on the display screen 41 as partially overlapping each other, the protrusion control section 52 controls the protrusion state of each of the plurality of protrusion members 20 in accordance with the display content of the entire region of the first window, which includes the overlapping portion, and the display content of the displayed region 66 of the second window. In the embodiment, the protrusion state of the protrusion members 20 which are protruded in accordance with the display content of the entire region of the first window and the displayed region 66 of the second window is controlled to the first state, and the protrusion state of the protrusion members 20 which are protruded in accordance with the display content of the hidden region 65 of the second window is controlled to the second state. In the embodiment, protrusion members 20 positioned at the coordinates on the operation surface 11*a* corresponding to the coordinates on the display screen 41 of an operation figure 44, including an operation figure 44 hidden under another window 60, correspond to the protrusion members 20 which are protruded in accordance with the display content.

In FIGS. 6 and 7 and FIGS. 8 and 11 to be referenced later, black-filled circular marks and circular marks, the areas inside which are hatched differently from their surroundings, represent protrusion members 20 controlled to the first state, and circular marks, the areas inside which are hatched in the same manner as their surroundings, represent protrusion members 20 controlled to the second state. In the drawings, in order to facilitate understanding of the present invention, shadows of the protrusion members 20 controlled to the first state formed on the operation surface 11*a* by light from the upper left side are depicted.

Although not shown, in the case where the first window and the second window are displayed on the display screen 41 with no overlap between each other (that is, as separated from each other), the protrusion control section 52 controls the protrusion state of each of the plurality of protrusion members 20 in accordance with the display content of the entire region of the first window and the display content of the entire region of the second window. Specifically, in the embodiment, in the case where the first window and the second window are displayed on the display screen 41 with no overlap between each other, the protrusion control section 52 controls the protrusion state of the protrusion members 20 which are protruded in accordance with the display content of the entire region of the first window and the entire region of the second window to the first state. For example, as shown in FIGS. 6 and 7, in the case where the slide-support window 61 and the non-slide-support window 62 are displayed on the display screen 41 with no overlap between each other, it is determined that the protrusion status of one or more (for example, two) protrusion members 20 positioned at the corresponding coordinates corresponding to each of a total of four operation figures 44 is the first state, the four operation figures 44 including two operation figures 44 (see FIG. 6) displayed in the slide-support window 61 and two operation figures 44 (see FIG. 7) displayed in the non-slide-support window 62.

In the case where a partition line that partitions the window 60 into a plurality of partitions is displayed on the display screen 41, the status determination section 51 may determine that the protrusion status of one or more protrusion members 20 (for example, protrusion members 20 arranged in a straight or polygonal line) positioned at the coordinates on the operation surface 11*a* corresponding to the coordinates of the partition line is the first state. The first state in this case may either be the maximally displaced state or the intermediately displaced state.

The status determination section 51 includes a corresponding region setting section 58. The corresponding region setting section 58 is a functional section that, in the case where a window 60 is displayed on the display screen 41, sets a corresponding region 90 on the operation surface 11*a* in correspondence with the window 60. In the case where a plurality of windows 60 are displayed on the display screen 41, the corresponding region setting section 58 sets a corresponding region 90 on the operation surface 11*a* in correspondence with each of the plurality of windows 60. The corresponding region 90 includes a slide-support region 91 which is a corresponding region that receives a slide operation performed on the operation surface 11*a* as an input operation, and a non-slide-support region 92 which is a corresponding region other than the slide-support region 91. That is, the non-slide-support region 92 is a corresponding region 90 that does not receive a slide operation performed on the operation surface 11*a* as an input operation.

In the embodiment, as shown in FIGS. 6 and 7, in the case where both the slide-support region 91 and the non-slide-support region 92 are set on the operation surface 11*a*, the status determination section 51 determines that the protrusion status of protrusion members 20 disposed at a first boundary D1 between a first operation surface region 71, which is an operation surface region including the slide-support region 91, and a second operation surface region 72, which is an operation surface region including the non-slide-support region 92, is the first state. The slide-support region 91 is a corresponding region 90 corresponding to the slide-support window 61, and the non-slide-support region 92 is a corresponding region 90 corresponding to the non-slide-support window 62. As a result, the protrusion control section 52 executes control so as to protrude the distal end portions 20*a* of the protrusion members 20 from the operation surface 11*a* along the first boundary D1. In FIGS. 6 and 7, the first operation surface region 71 and the second operation surface region 72 are shown as hatched differently. In the example, the first operation surface region 71 is set to be larger than the slide-support region 91, and the second operation surface region 72 is set to be larger than the non-slide-support region 92.

Figure 8:
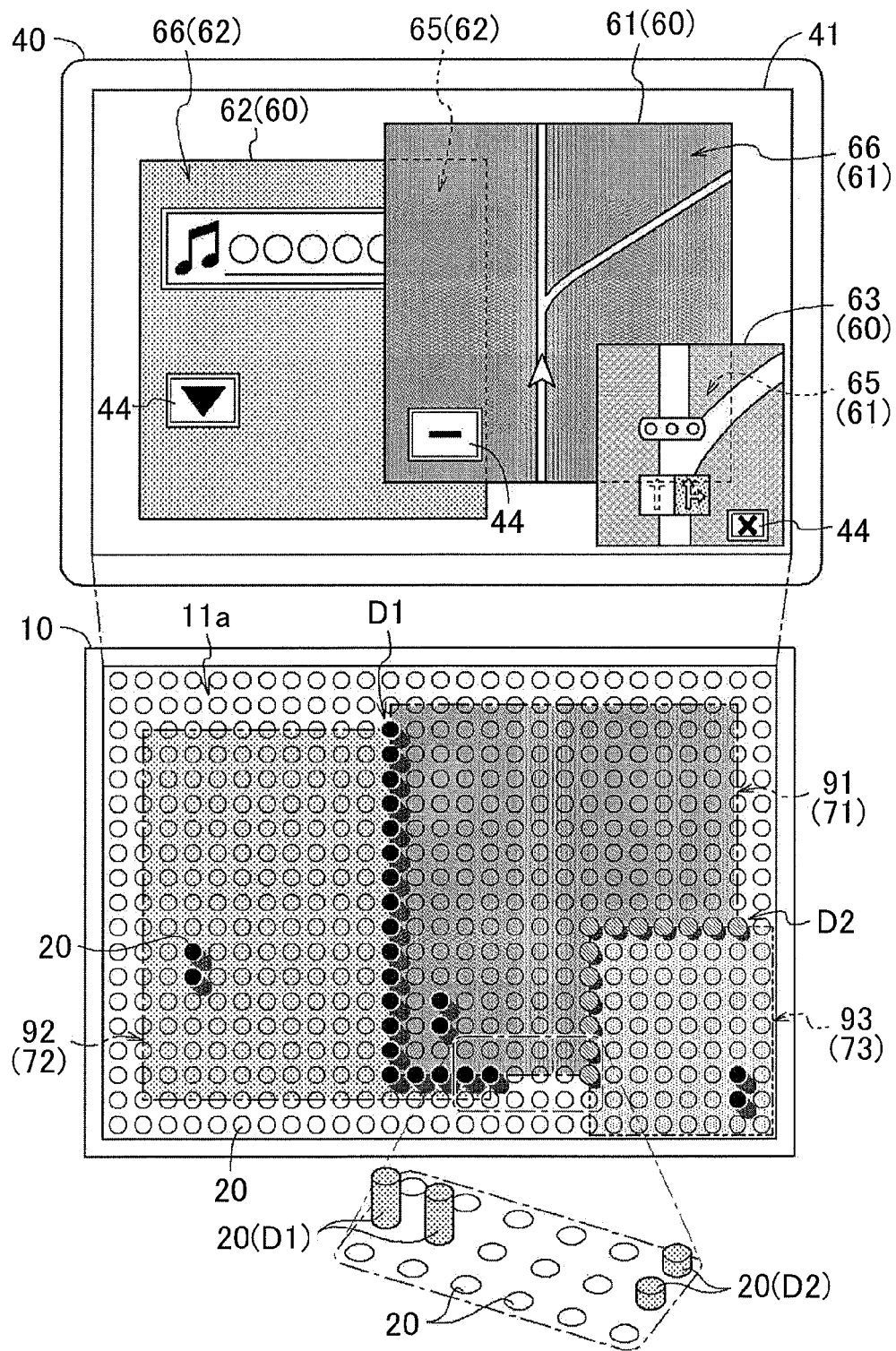
FIG. 8 shows a third example of the relationship between the display screen and the operation surface regions of the touch pad according to the embodiment of the present invention.

In the embodiment, further, in the case where a plurality of slide-support regions 91 are set on the operation surface 11*a*, the status determination section 51 determines that the protrusion status of protrusion members 20 disposed at a second boundary D2 between an operation surface region including the slide-support region 91 and an operation surface region including another slide-support region 91 is the first state. That is, in the case where a first slide-support region 91 which is a first one of the slide-support regions and a second slide-support region 93 which is a second one of the slide-support regions are set on the operation surface 11*a* as shown in FIG. 8, for example, it is determined that the protrusion status of protrusion members 20 disposed at the second boundary D2 between a first operation surface region 71, which is an operation surface region including the first slide-support region 91, and a third operation surface region 73, which is an operation surface region including the second slide-support region 93, is the first state. The second slide-support region 93 is a corresponding region 90 corresponding to a second slide-support window 63. As a result, the protrusion control section 52 executes control so as to protrude the distal end portions 20a of the protrusion members 20 from the operation surface 11a along the second boundary D2.

In the example shown in FIG. 8, the first operation surface region 71 is set to have the same size as that of the first slide-support region 91, and the third operation surface region 73 is set to have the same size as that of the second slide-support region 93. In addition, the second operation surface region 72 is set to have the same size as that of the non-slide-support region 92. In the case where the operation surface regions are set to have the same size as that of the corresponding regions 90, it may be determined that the protrusion status of all the protrusion members 20 disposed at the outer peripheral portion of the operation surface regions is the first state. In this case, the entire peripheries of the operation surface regions are defined by the protrusion members 20 in the first state.

In the example shown in FIG. 8, in the relationship between a first slide-support window 61 and the second slide-support window 63, the second slide-support window 63 corresponds to the "first window" according to the present invention, and the first slide-support window 61 corresponds to the "second window" according to the present invention. In addition, in the relationship between the first slide-support window 61 and the non-slide-support window 62, the first slide-support window 61 (specifically, a portion of the displayed region 66 in the first slide-support window 61) corresponds to the "first window" according to the present invention, and the non-slide-support window 62 corresponds to the "second window" according to the present invention.

In the example shown in FIG. 8, the non-slide-support region 92 is also set in addition to the plurality of slide-support regions 91. Consequently, in the example shown in FIG. 8, both the first boundary D1 and the second boundary D2 are set on the operation surface 11a. In the embodiment, in this case, the status determination section 51 determines that the protrusion status of the protrusion members 20 disposed at the first boundary D1 and the protrusion status of the protrusion members 20 disposed at the second boundary D2 are the first state at different levels from each other. As a result, the protrusion control section 52 executes control so as to protrude the distal end portions 20a of the protrusion members 20 from the operation surface 11a along the second boundary D2 into a protrusion state different from that at the first boundary D1. FIG. 8 shows an example in which the protrusion status of the protrusion members 20 disposed at the first boundary D1 is the maximally displaced state, and in which the protrusion status of the protrusion members 20 disposed at the second boundary D2 is an intermediately displaced state (specifically, with the protrusion amount from the operation surface 11a being about one third of the maximum protrusion amount). Conversely, it may be determined that the protrusion status of the protrusion members 20 disposed at the first boundary D1 is an intermediately displaced state, and that the protrusion status of the protrusion members 20 disposed at the second boundary D2 is the maximally displaced state.

Although not shown, in the case where a plurality of non-slide-support regions 92 are set on the operation surface 11a, the status determination section 51 may determine that the protrusion status of protrusion members 20 disposed at a third boundary between an operation surface region including a non-slide-support region 92 and an operation surface region including another non-slide-support region 92 is the first state. In this event, the protrusion state of the protrusion members 20 disposed at the third boundary may be different from any of the protrusion state of the protrusion members 20 disposed at the first boundary D1 and the protrusion state of the protrusion members 20 disposed at the second boundary D2. Alternatively, the protrusion state of the protrusion members 20 disposed at the third boundary may be the same as any of the protrusion state of the protrusion members 20 disposed at the first boundary D1 and the protrusion state of the protrusion members 20 disposed at the second boundary D2.

In the embodiment, as shown in FIGS. 6 to 8, in setting a plurality of corresponding regions 90 on the operation surface 11a, the corresponding region setting section 58 causes the ratio in area between the corresponding regions 90 to coincide with the ratio in area between respective visible portions, on the display screen 41, of the windows 60 correlated with the corresponding regions 90. For a window 60 positioned on the foremost side, the visible portion refers to the entire region of the window 60. For a window 60 partially hidden under another window 60, the visible portion refers to the displayed region 66 of the window 60. In the embodiment, further, the corresponding region setting section 58 sets the corresponding regions 90 such that the shapes of the corresponding regions 90 and the shapes of the visible portions of the windows 60 correlated with the corresponding regions 90 are analogous to each other as shown in FIGS. 6 to 8. The shapes of the corresponding regions 90 and the shapes of the visible portions of the windows 60 correlated with the corresponding regions 90 may be different from each other in ratio between the dimension in the up-down direction and the dimension in the left-right direction.

In the example shown in FIG. 8, the operation surface regions 71, 72, and 73 are set to have the same sizes as corresponding ones of the corresponding regions 91, 92, and 93 (this also applies to FIG. 11 to be referenced later). In the examples shown in FIGS. 6 and 7, by contrast, the operation surface regions 71 and 72 are set to have a larger area than corresponding ones of the corresponding regions 91 and 92. In this event, the operation surface regions 71 and 72 are set such that the sum of the operation surface regions 71 and 72 is equal to the entire region of the operation surface 11a as shown in FIGS. 6 and 7. In this event, the operation surface regions 71 and 72 are preferably set such that line segments obtained by extending respective end portions of a boundary line between the corresponding regions 90 to the outer periphery of the operation surface 11a over the shortest distance form the boundary (first boundary D1) between the operation surface regions as shown in FIGS. 6 and 7. In FIGS. 6 and 7, black-filled circular marks represent protrusion members 20 disposed at the boundary between the corresponding regions 90, and circular marks, the areas inside which are hatched differently from their surroundings, represent protrusion members 20 disposed at portions of the first boundary D1 excluding the boundary between the corresponding regions 90. The former protrusion members 20 and the latter protrusion members 20 may be controlled to the same protrusion state, or may be controlled to different protrusion states.

4. Process Procedures of Operation Input Reception Process

The process procedures of the operation input reception process performed by the operation input system 3 according to the embodiment will be described with reference to FIGS.

9 and 10. The procedures of the operation input reception process described below are executed by hardware or software (a program) implementing the functional sections of the operation input computation section 50, or a combination of both. In the case where the functional sections are implemented by a program, the arithmetic processing unit provided in the operation input computation section 50 operates as a computer that executes the program implementing the functional sections.

4-1. Procedures of Operation Input Reception Process

Figure 9:
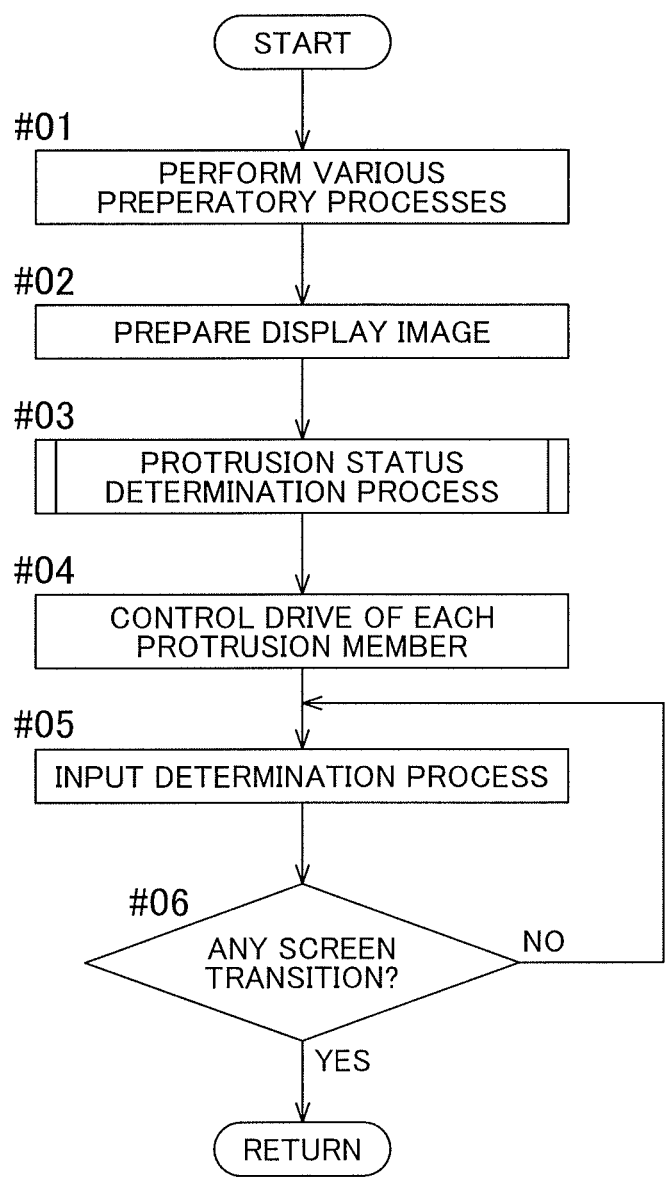
FIG. 9 is a flowchart showing the overall process procedures of an operation input reception process according to the embodiment of the present invention.

In the operation input reception process, as shown in FIG. 9, first, various preparatory processes are executed (step #01). Examples of the preparatory processes include preparing a work area for preparing a display image. Next, a display image is actually prepared, and an image is displayed on the display screen 41 (step #02). A protrusion status determination process is executed for each protrusion member 20 on the basis of the display image prepared in step #02 (step #03). The protrusion status determination process in step #03 will be described in detail later with reference to FIG. 10. The determined protrusion status is set in the form of ON/OFF, for example. Next, the protrusion members 20 are driven so as to be advanced and retracted by the drive mechanism 30 on the basis of the protrusion status determined in step #03 (step #04). An input determination process is executed in this state (step #05).

In the input determination process in step #05, an operation input to the display input device 40 or the touch pad 10 is sensed. The input operation to be sensed includes a touch operation (including a tap operation and a double-tap operation) performed on the operation surface 11a, a slide operation, and a depression operation for the protrusion member 20. Before an input operation that involves a screen transition is sensed (step #06: No), the input determination process in step #05 is continuously executed. In the case where an input operation that involves a screen transition, such as a process for scrolling a map image is sensed (step #06: Yes), the operation input reception process is terminated, and the processes in step #01 and the subsequent steps are executed again on the display screen after the change. The processes described above are repeatedly and successively executed.

4-2. Procedures of Protrusion Status Determination Process

Figure 10:
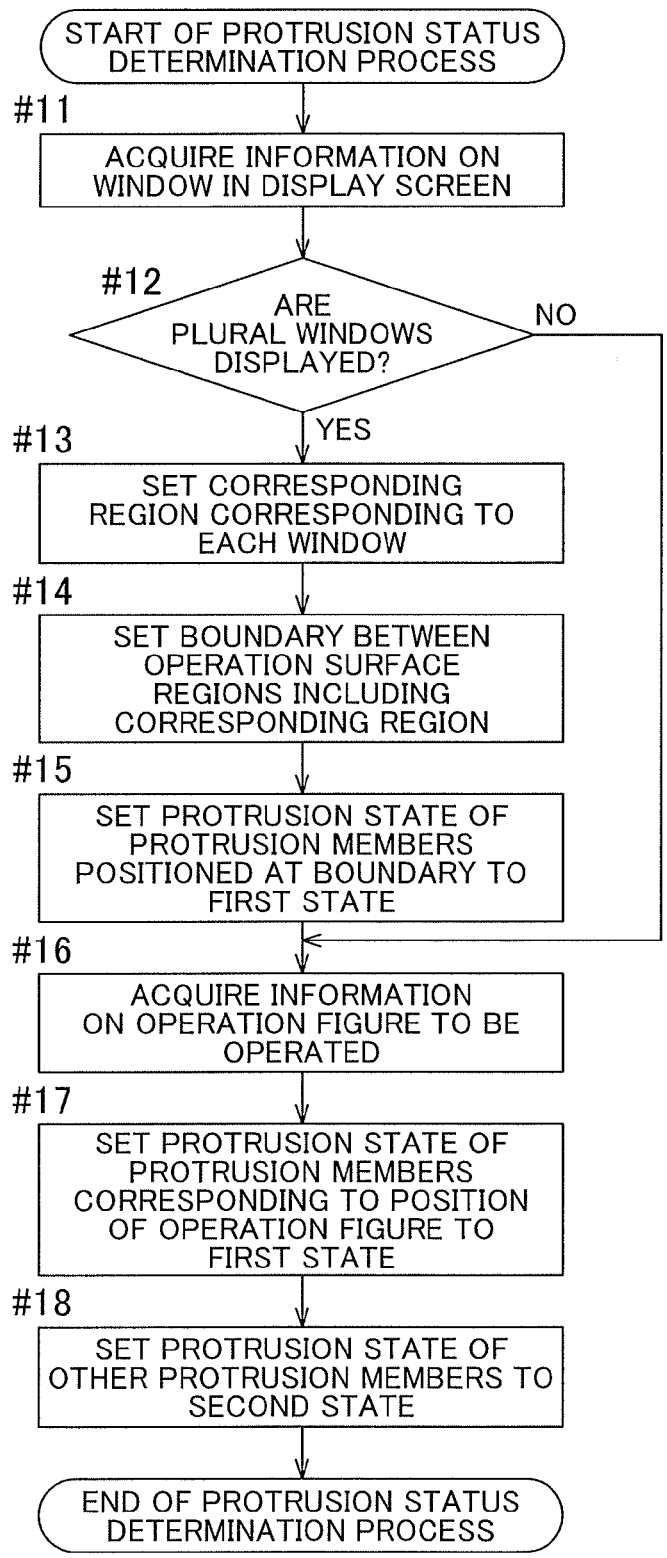
FIG. 10 is a flowchart showing the process procedures of a protrusion status determination process according to the embodiment of the present invention.

Next, the protrusion status determination process in step #03 of FIG. 9 will be described with reference to FIG. 10. First, information on a window in the display screen 41 is acquired (step #11). The window information acquired in this step includes information on the display position, the display size, the number and positions of operation figures 44, etc. for each window 60 in the display screen 41. In the case where a plurality of windows 60 are displayed in the display screen 41 (step #12: Yes), a corresponding region 90 is set on the operation surface 11a in correspondence with each of the windows 60 (step #13), and a boundary between operation surface regions including the corresponding regions 90 is set (step #14). The boundary set in this step includes the first boundary D1 and the second boundary D2 discussed above. Then, the protrusion status of the protrusion members 20 positioned at the boundary set in step #14 is set to the first state (step #15), and the process proceeds to step #16. In the case where a plurality of windows 60 are not displayed in the display screen 41 (step #12: No), the process directly proceeds to step #16. In this event, in the case where only one window 60 excluding the root window is displayed on the display screen 41, the corresponding region 90 corresponding to the window 60 may be set as the entire region of the operation surface 11a.

In step #16, information (operation figure information) on an operation figure 44 to be operated is acquired on the basis of the positional relationship between the windows in the front-back direction. The operation figure 44 to be operated refers to an operation figure 44 displayed on the display screen 41 rather than being hidden under another window 60. Then, the protrusion status of the protrusion members 20 corresponding to the position of the operation figure 44 to be operated is set to the first state (step #17), and the protrusion status of the other protrusion members 20 is set to the second state (step #18). The protrusion status determination process is thus terminated.

With the protrusion status determination process executed as described above, in the case where an operation figure 44 is displayed on the display screen 41, the protrusion members 20 corresponding to the operation figure 44 are controlled to the first state by executing the process in step #04 of FIG. 9. In the case where a boundary between operation surface regions such as the first boundary D1 and the second boundary D2 is set on the operation surface 11a, in addition, the protrusion members 20 disposed at the boundary are controlled to the first state. The other protrusion members 20 are controlled to the second state.

5. Other Embodiments

Lastly, operation input systems according to other embodiments of the present invention will be described. A configuration disclosed in each of the following embodiments may be applied in combination with a configuration disclosed in any other embodiment.

(1) In the embodiment described above, in setting a plurality of corresponding regions 90 on the operation surface 11a, the corresponding region setting section 58 causes the ratio in area between the corresponding regions 90 to coincide with the ratio in area between respective visible portions, on the display screen 41, of the windows 60 correlated with the corresponding regions 90. However, embodiments of the present invention are not limited thereto. That is, in setting a plurality of corresponding regions 90 on the operation surface 11a, the corresponding region setting section 58 may cause the ratio in area between the corresponding regions 90 to be different from the ratio in area between respective visible portions, on the display screen 41, of the windows 60 correlated with the corresponding regions 90.

Figure 11:
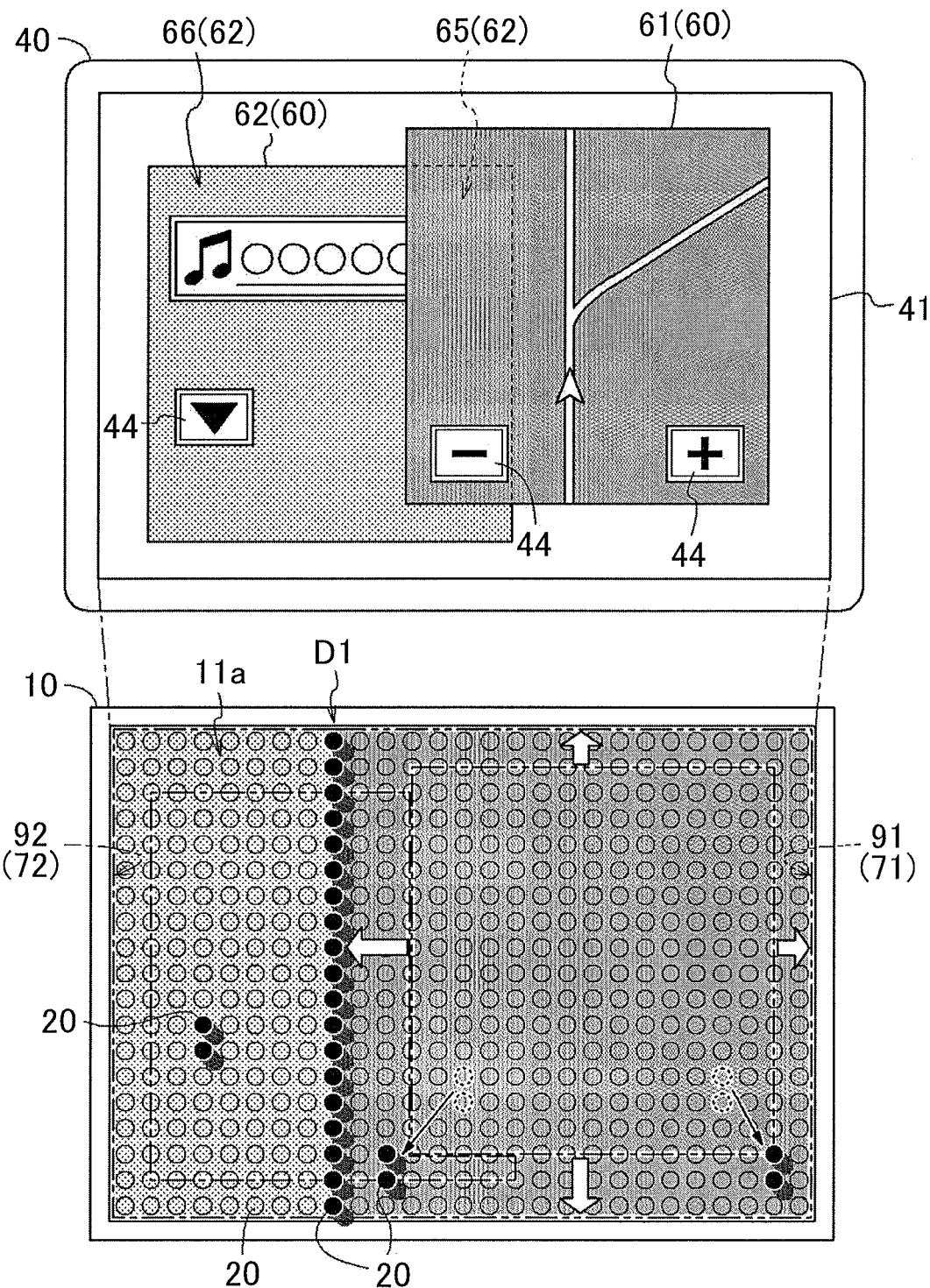
FIG. 11 shows an example of the relationship between a display screen and operation surface regions of a touch pad according to another embodiment of the present invention.

For example, in one preferred embodiment of the present invention, in setting both a slide-support region 91 and a non-slide-support region 92 on the operation surface 11a, the corresponding region setting section 58 may set the ratio in area of the slide-support region 91 to the non-slide-support region 92 to be higher than the ratio in area of a visible portion, on the display screen 41, of a window 60 (slide-support window 61) corresponding to the slide-support region 91 to a visible portion, on the display screen 41, of a window 60 (non-slide-support window 62) corresponding to the non-slide-support region 92 as shown in FIG. 11. For comparison, FIG. 11 shows the slide-support region 91 and the non-slide-support region 92 for a case of FIG. 6 according to the embodiment described above. In the example, the slide-support region 91 for the case of FIG. 6 is expanded to both sides in the up-down direction and to both sides in the left-right direction until the length of the sides of the slide-support region 91 extending in the up-down direction coincides with the dimension of the operation surface 11a in the up-down direction, and the entire region of the operation surface 11a excluding the slide-support region 91 is set as the non-slide-support region 92. In the example, in addition, protrusion members 20 correlated with operation figures 44 are moved outward along with expansion of the slide-support region 91, which secures a large operation surface region in which a slide operation can be performed.

(2) In the embodiment described above, in the case where both the slide-support region 91 and the non-slide-support region 92 are set on the operation surface 11*a*, the protrusion control section 52 protrudes the distal end portions 20*a* of the protrusion members 20 from the operation surface 11*a* along the first boundary D1 between an operation surface region including the slide-support region 91 and an operation surface region including the non-slide-support region 92. However, embodiments of the present invention are not limited thereto. That is, the protrusion control section 52 may be configured not to protrude the distal end portions 20*a* of the protrusion members 20 from the operation surface 11*a* along the first boundary D1, but to control the protrusion state of the protrusion members 20 disposed along the first boundary D1 to the second state.

(3) In the embodiment described above, in the case where a plurality of slide-support regions 91 are set on the operation surface 11*a*, the protrusion control section 52 protrudes the distal end portions 20*a* of the protrusion members 20 from the operation surface 11*a* along the second boundary D2 between an operation surface region including a slide-support region 91 and an operation surface region including another slide-support region 91. However, embodiments of the present invention are not limited thereto. That is, the protrusion control section 52 may be configured not to protrude the distal end portions 20*a* of the protrusion members 20 from the operation surface 11*a* along the second boundary D2, but to control the protrusion state of the protrusion members 20 disposed along the second boundary D2 to the second state.

(4) In the embodiment described above, in the case where both the first boundary D1 and the second boundary D2 are set on the operation surface 11*a*, the protrusion control section 52 protrudes the distal end portions 20*a* of the protrusion members 20 from the operation surface 11*a* along the second boundary D2 into a protrusion state different from that at the first boundary D1. However, embodiments of the present invention are not limited thereto. For example, in the case where both the first boundary D1 and the second boundary D2 are set on the operation surface 11*a*, the protrusion control section 52 may protrude the distal end portions 20*a* of the protrusion members 20 from the operation surface 11*a* along the second boundary D2 into the same protrusion state as that at the first boundary D1.

(5) In the embodiment described above, the protrusion control section 52 is configured to control the protrusion state of the protrusion members 20 which are protruded in accordance with the display content of the entire region of the first window and the displayed region 66 of the second window to the first state, and to control the protrusion state of the protrusion members 20 which are protruded in accordance with the display content of the hidden region 65 of the second window to the second state. However, embodiments of the present invention are not limited thereto. That is, the protrusion control section 52 may be configured to control the protrusion state of the protrusion members 20 which are protruded in accordance with the display content of the hidden region 65 of the second window to the first state with a smaller protrusion amount from the operation surface 11*a* than that in the protrusion state of the protrusion members 20 which are protruded in accordance with the display content of the entire region of the first window and the displayed region 66 of the second window. For example, the protrusion control section 52 may be configured to control the protrusion state of the protrusion members 20 which are protruded in accordance with the display content of the entire region of the first window and the displayed region 66 of the second window to the maximally displaced state, and to control the protrusion state of the protrusion members 20 which are protruded in accordance with the display content of the hidden region 65 of the second window to an intermediately displaced state.

(6) In the embodiment described above, the level of the distal end portion 20*a* of the protrusion member 20 in the protrusion direction Z coincides with the level of the operation surface 11*a* when the protrusion member 20 is positioned at the lowest within its movable range in the protrusion direction Z (in the minimally displaced state). However, embodiments of the present invention are not limited thereto. For example, the level, in the protrusion direction Z, of the distal end portion 20*a* of the protrusion member 20 in the minimally displaced state may be lower than the level of the operation surface 11*a*. Conversely, the level, in the protrusion direction Z, of the distal end portion 20*a* of the protrusion member 20 in the minimally displaced state may be higher than the level of the operation surface 11*a*. In the latter case, in the process in step #18 of FIG. 10 described above, the protrusion state of the other protrusion members 20 is set to the first state (for example, the minimally displaced state) with a smaller protrusion amount from the operation surface 11*a* than that in the first state (in the example, the maximally displaced state) set in the processes in steps #15 and #17.

(7) In the embodiment described above, the hole portions 12 and the protrusion members 20 are arranged in a matrix on the operation surface 11*a*. However, embodiments of the present invention are not limited thereto. For example, the hole portions 12 and the protrusion members 20 may be arranged in a honeycomb structure (hexagonal grid) on the operation surface 11*a*.

(8) In the embodiment described above, the protrusion direction Z of the protrusion members 20 is orthogonal to the operation surface 11*a*. However, embodiments of the present invention are not limited thereto. That is, the protrusion direction Z of the protrusion members 20 may intersect the operation surface 11*a* at an acute angle (for example, 80 degrees).

(9) In the embodiment described above, the operation input device 4 is communicably connected to the display input device 40 formed by integrating a display device and an input device such as a touch panel. However, embodiments of the present invention are not limited thereto. That is, the presence of a touch panel is not essential, and it is only necessary that the operation input device 4 should be connected to a display device including at least a display screen.

(10) In the embodiment described above, the state sensing section 56 is configured to sense the actual protrusion status of each protrusion member 20 on the basis of information acquired from a position sensor. However, embodiments of the present invention are not limited thereto. For example, the state sensing section 56 may be configured to sense the actual protrusion status of each protrusion member 20 using the piezoelectric element 31 provided in the drive mechanism 30 as a sensor element, by utilizing the characteristics of the piezoelectric element 31. For example, the characteristics of the piezoelectric element 31 that an electric signal is generated in response to an external force (a depressing force provided by the user) may be utilized. In addition, the position sensing section 53 may be configured to sense that the protrusion member 20 has transitioned from the first state to the second state in the case where the position sensing section 53 senses contact of an object to be sensed with or proximity of an object to be sensed to a region on the operation surface 11*a* set so as to include only one protrusion member 20.

(11) In the embodiment described above, the operation input computation section 50 includes the functional sections 51 to 58. However, embodiments of the present invention are not limited thereto. That is, the assignment of the functional sections described in relation to the embodiment described above is merely illustrative, and a plurality of functional sections may be combined with each other, or a single functional section may be further divided into sub-sections. In the embodiment described above, in addition, the control device 5 includes hardware common to a control device for the navigation apparatus 1. However, the control device 5 for the operation input system 3 and the control device for the navigation apparatus 1 may include separate pieces of hardware.

(12) In the embodiment described above, the operation input system 3 allows an input into the in-vehicle navigation apparatus 1. However, embodiments of the present invention are not limited thereto. That is, the operation input system according to the present invention may allow to perform operation input to a navigation system in which the components of the navigation apparatus 1 described in the embodiment described above are distributed to a server device and an in-vehicle terminal device, a laptop personal computer, a gaming device, and other systems and devices such as control devices for various machines, for example.

(13) Also regarding other configurations, the embodiment disclosed herein is illustrative in all respects, and the present invention is not limited thereto. That is, a configuration not described in the claims of the present invention may be altered without departing from the object of the present invention.

The present invention may be suitably applied to an operation input system including a display device having a display screen, an input device that allows an input into the display device, and a control device.

What is claimed is:

1. An operation input system comprising:
a display device including a display screen;
an input device that provides an input into the display device; and
a control device, wherein:
the display device is configured to display an image including a plurality of windows on the display screen;
the input device includes a plurality of protrusion members arranged along an operation surface of the input device and provided so as to independently protrude from the operation surface;
the control device includes:
a protrusion control section that controls a protrusion state of each of the plurality of protrusion members in accordance with a display content in the windows displayed on the display screen; and
a corresponding region setting section that, in the case where the plurality of windows are displayed on the display screen, sets a corresponding region on the operation surface in correspondence with a shape of a visible portion on the display screen of each of the plurality of windows; and
in the case where at least a first window and a second window are displayed on the display screen as partially overlapping each other, the protrusion control section makes the protrusion state of each of the protrusion members protruded in accordance with the display content of a hidden region of the second window different from the protrusion state of the protrusion members protruded in accordance with the display content of an entire region of the first window and a displayed region of the second window, the hidden region being a region of the second window hidden under the first window in an overlapping portion between the first window and the second window, and the displayed region being a region of the second window other than the hidden region,
wherein a protrusion state in which a level of a distal end portion of the protrusion member in a protrusion direction is higher than a level of the operation surface is defined as a first state, and a protrusion state in which the level of the distal end portion of the protrusion member in the protrusion direction is not higher than the level of the operation surface is defined as a second state,
the corresponding region corresponding to the first window is a first corresponding region and the corresponding region corresponding to the second window is a second corresponding region, and
the protrusion control section, in the case where the first window and the second window are displayed on the display screen as partially overlapping each other, further controls the protrusion state of each of the plurality of projection members such that the protrusion state of the protrusion members controlled in accordance with the display content of the hidden region is controlled to the second state, such that the protrusion state of each of the protrusion members controlled in accordance with the display content of the entire region of the first window and the displayed region of the second window is controlled to the first state, and such that the protrusion state of each of the protrusion members disposed at a boundary between operation surface regions that is a boundary between an operation surface region including the first corresponding region and an operation surface region including the second corresponding region is controlled to the first state,
wherein the boundary between operation surface regions is configured to include a boundary between corresponding regions that is a boundary between the first corresponding region and the second corresponding region and a boundary along line segments obtained by extending respective end portions of the boundary between corresponding regions to an outer periphery of the operation surface over the shortest distance.

2. The operation input system according to claim 1, wherein in the case where the first window and the second window are displayed on the display screen with no overlap between each other, the protrusion control section controls the protrusion state of each of the plurality of protrusion members in accordance with the display content of the entire region of the first window and the display content of the entire region of the second window.

3. The operation input system according to claim 1, wherein:
in the case where both at least one slide-support region and a non-slide-support region are set on the operation surface, the slide-support region being a type of the corresponding region in which a slide operation performed on the operation surface is received as an input operation and the non-slide-support region being a type of the corresponding region other than the slide- support region, the protrusion control section protrudes the distal end portion of the protrusion member from the operation surface along a first boundary between an operation surface region including the slide-support region and an operation surface region including the non-slide-support region.

4. The operation input system according to claim 3, wherein in the case where a first slide-support region, a second slide-support region, and the non-slide-support region are set on the operation surface, the first slide-support region being a first one of the slide-support regions and the second slide-support region being a second one of the slide-support regions, the protrusion control section protrudes the distal end portion of the protrusion member from the operation surface along a second boundary between an operation surface region including the first slide-support region and an operation surface region including the second slide-support region into a protrusion state different from the protrusion state at the first boundary.

5. The operation input system according to claim 3, wherein in setting both the slide-support region and the non-slide-support region on the operation surface, the corresponding region setting section makes a ratio in area of the slide-support region to the non-slide-support region higher than a ratio in area of a visible portion, on the display screen, of the window corresponding to the slide-support region to a visible portion, on the display screen, of the window corresponding to the non-slide-support region.

* * * * *